US012686153B2

(12) United States Patent
Bellio et al.

(10) Patent No.: US 12,686,153 B2
(45) Date of Patent: Jul. 21, 2026

(54) METHOD AND APPARATUS FOR ANALYZING A SEPARATOR AND PLANT FOR TREATING INCOHERENT PLASTICS

(71) Applicant: PIOVAN S.P.A., Santa Maria di Sala (IT)

(72) Inventors: Enrico Bellio, Ponzano Veneto (IT); Davide Cappellini, Soncino (IT)

(73) Assignee: PIOVAN S.P.A., Santa Maria di Sala (IT)

( * ) Notice: Subject to any disclaimer, the term of this patent is extended or adjusted under 35 U.S.C. 154(b) by 886 days.

(21) Appl. No.: 17/926,165

(22) PCT Filed: May 24, 2021

(86) PCT No.: PCT/IB2021/054474
§ 371 (c)(1),
(2) Date: Nov. 18, 2022

(87) PCT Pub. No.: WO2021/240335
PCT Pub. Date: Dec. 2, 2021

(65) Prior Publication Data
US 2023/0191663 A1 Jun. 22, 2023

(30) Foreign Application Priority Data
May 26, 2020 (IT) ........................ 102020000012436

(51) Int. Cl.
*B29B 13/06* (2006.01)
*B01D 53/04* (2006.01)
(Continued)

(52) U.S. Cl.
CPC ............ *B29B 13/065* (2013.01); *B01D 53/04* (2013.01); *B01D 53/261* (2013.01);
(Continued)

(58) Field of Classification Search
None
See application file for complete search history.

(56) References Cited

U.S. PATENT DOCUMENTS

| | | | |
|---|---|---|---|
| 4,317,797 A | 3/1982 | Smith | |
| 4,839,969 A | 6/1989 | Hahn | |
| (Continued) | | | |

FOREIGN PATENT DOCUMENTS

| | | |
|---|---|---|
| AT | 505 299 A4 | 12/2008 |
| CN | 109529529 A | 3/2019 |
| (Continued) | | |

OTHER PUBLICATIONS

Jul. 2, 2021 International Search Report issued in International Patent Application No. PCT/IB2021/054474.
Jul. 2, 2021 Written Opinion issued in International Patent Application No. PCT/IB2021/054474.

*Primary Examiner* — Gabriel E Gitman
(74) *Attorney, Agent, or Firm* — Oliff PLC

(57) ABSTRACT

A method and an apparatus are disclosed for analyzing an absorption filtering medium that filters volatile organic substances in a process gas in a dehumidification plant for dehumidifying polymer granules, with a fan that generates a flow of gas through the filtering medium, an analyzer for analyzing the concentration of total organic carbon, a sensor for detecting pressure downstream of the filtering medium, in which the state of saturation and/or the absorbent capacity and/or the deterioration over time of the filtering medium is determined by a comparison of the measured concentrations of the total organic carbon in the flow of gas upstream and downstream of the filtering medium.

9 Claims, 11 Drawing Sheets

(51) Int. Cl.

| | | |
|---|---|---|
| *B01D 53/26* | (2006.01) | |
| *B29B 9/16* | (2006.01) | |
| *F26B 9/06* | (2006.01) | |
| *F26B 21/25* | (2026.01) | |
| *F26B 21/33* | (2026.01) | |
| *B29B 13/00* | (2006.01) | |

(52) U.S. Cl.
CPC .............. *B01D 53/265* (2013.01); *B29B 9/16* (2013.01); *F26B 9/063* (2013.01); *F26B 21/25* (2026.01); *F26B 21/33* (2026.01); *B01D 2253/102* (2013.01); *B01D 2253/116* (2013.01); *B01D 2257/708* (2013.01); *B29B 2009/161* (2013.01); *B29B 2013/005* (2013.01); *F26B 2200/08* (2013.01)

(56) References Cited

U.S. PATENT DOCUMENTS

| | | | |
|---|---|---|---|
| 5,709,038 A * | 1/1998 | Scheufler ............... | B01D 50/00 |
| | | | 34/271 |
| 6,745,492 B1 | 6/2004 | Haesendonckx | |
| 2012/0098153 A1 | 4/2012 | Forsthovel | |
| 2013/0015604 A1* | 1/2013 | Hallaji ..................... | B29B 9/16 |
| | | | 264/234 |

FOREIGN PATENT DOCUMENTS

| | | |
|---|---|---|
| CN | 110548361 A | 12/2019 |
| EP | 0 835 694 A1 | 4/1998 |
| WO | 2014/088630 A1 | 6/2014 |

* cited by examiner

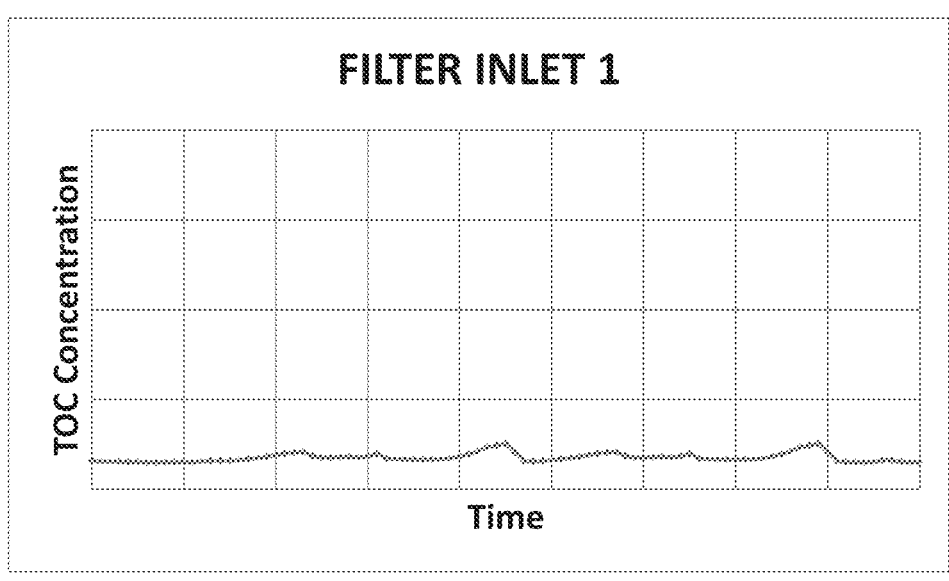
Low TOC inlet concentration
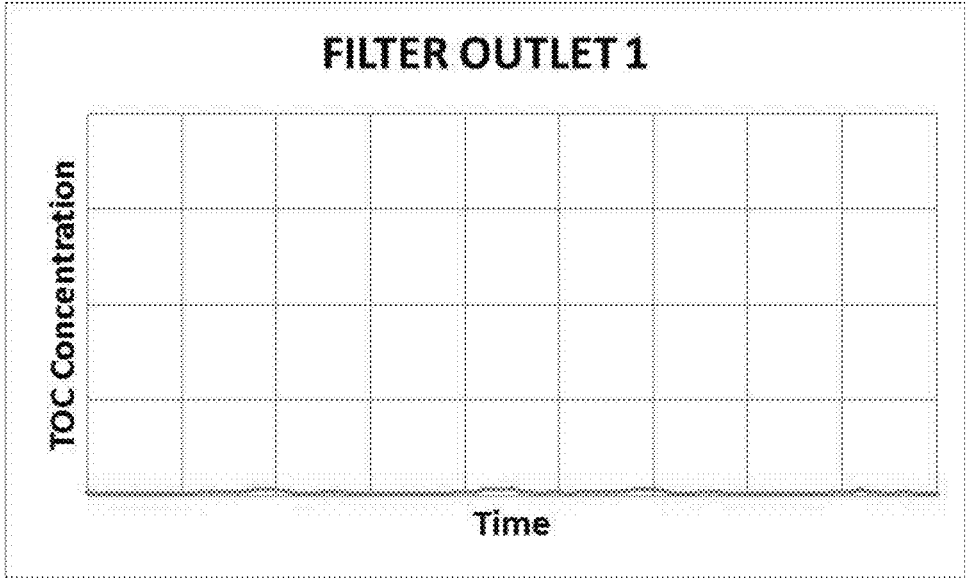
Low TOC outlet concentration
Fig. 3

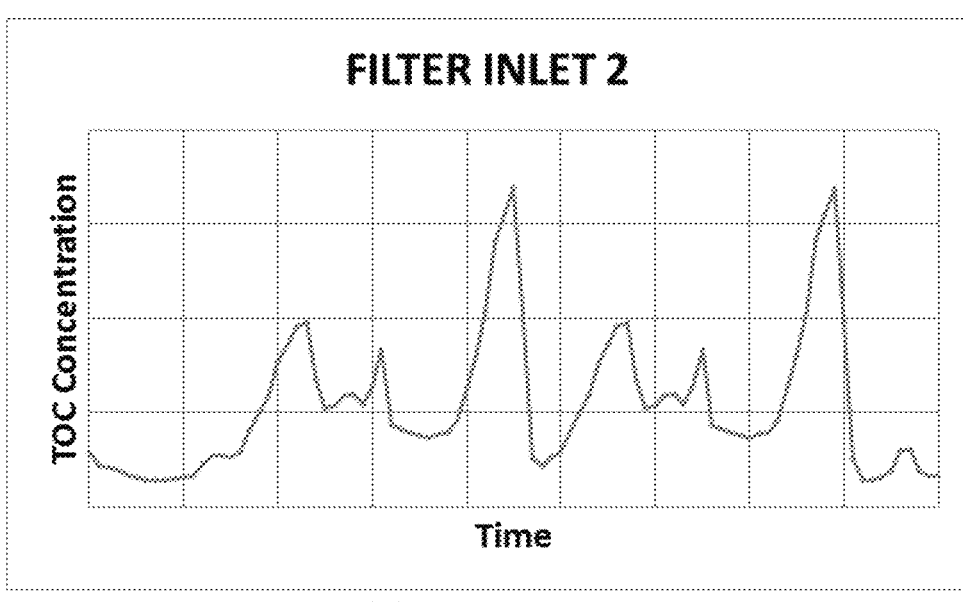
High TOC inlet concentration
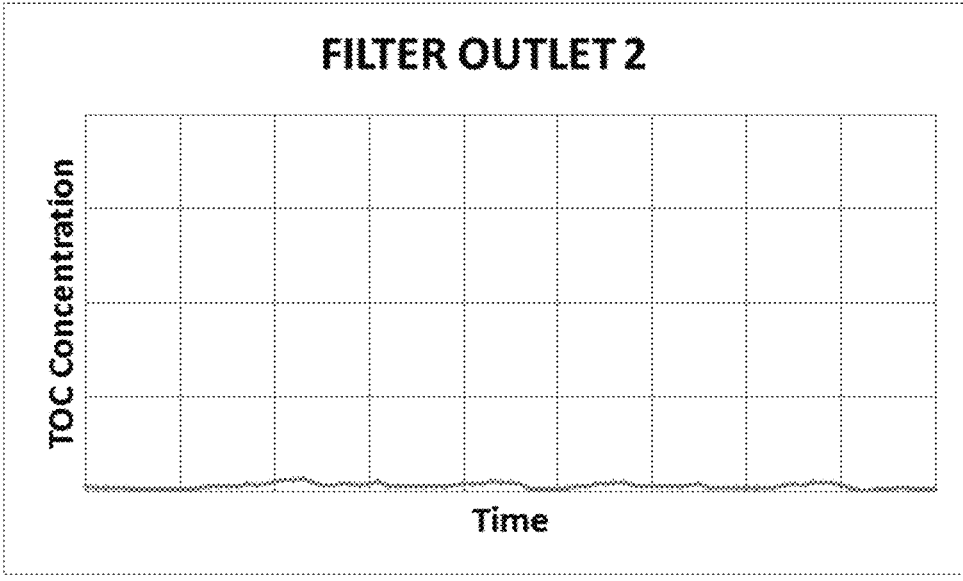
Low TOC outlet concentration
Fig. 4

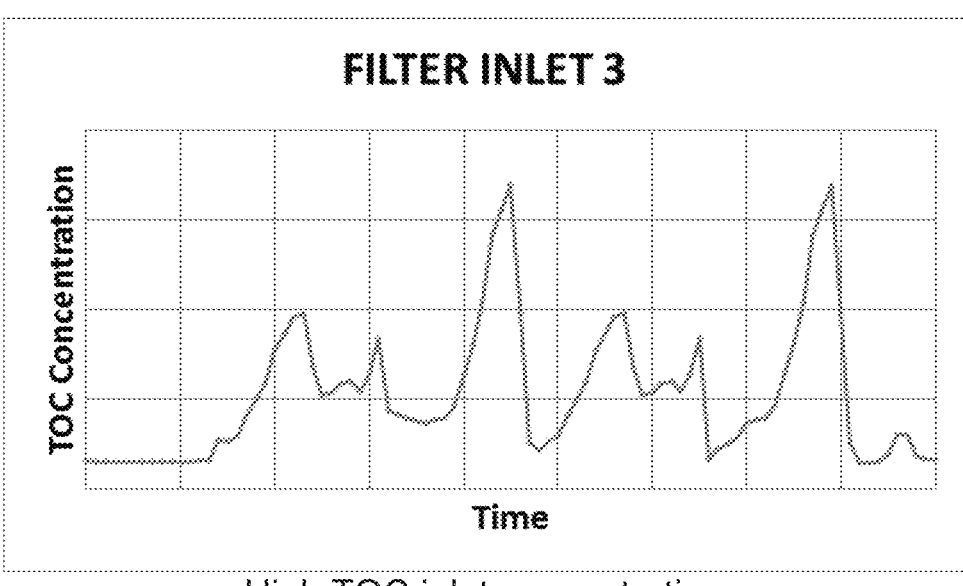
High TOC inlet concentration
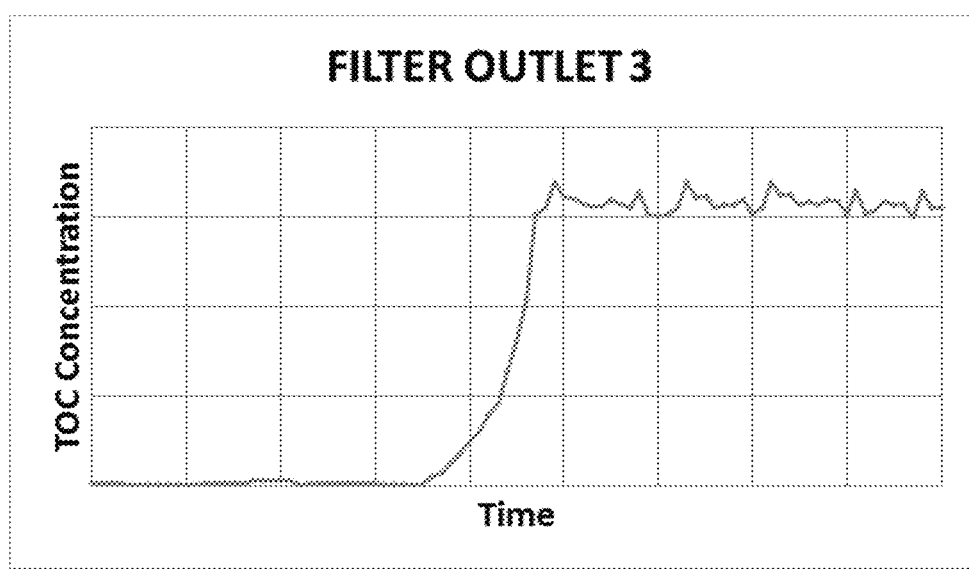
High TOC outlet concentration
Fig. 5

| Component | Molecolar weight [g/mol] | No. carbon atoms | Measured value [mgC/Nm3] | Air flow of dehumidification system [m3/h] |
|---|---|---|---|---|
| Methane base | 16,04 | 1 | 0,91 | 1930 |
| Heavy HC (benzene) | 78,11 | 6 | 0,33 | 1930 |
| VOC (Line 16) | 44,05 | 2 | 1,92 | 1930 |
| VOC (Line 17) | 44,05 | 2 | 1,92 | 1930 |
| VOC (Line 19) | 44,05 | 2 | 0,23 | 1930 |

| Component | Component concentration [ppm] | Component concentration [mg/Nm3] | Component hourly concentration [mg/h] | Component concentration [g/h] |
|---|---|---|---|---|
| Methane base | 1,70 | 1,216 | 2348 | 2,35 |
| Heavy HC (benzene) | 0,10 | 0,358 | 691 | 0,69 |
| VOC (Line 16) | 1,79 | 3,524 | 6801 | 6,80 |
| VOC (Line 17) | 1,79 | 3,524 | 6801 | 6,80 |
| VOC (Line 19) | 0,21 | 0,422 | 815 | 0,81 |

Fig. 10

METHOD AND APPARATUS FOR ANALYZING A SEPARATOR AND PLANT FOR TREATING INCOHERENT PLASTICS

BACKGROUND OF THE INVENTION

The invention relates to a method and/or an apparatus for analyzing and/or monitoring a separator, in particular a separator used for a process gas in the context of a treatment of plastics in incoherent state, i.e. in the form of granules and/or microgranules and/or powder and/or flakes or the like. The invention can be used, in particular, to determine the operating condition of a separator such as, for example, an absorption filtering medium and/or a condensation dehumidifier.

Specifically, but not exclusively, the invention can be applied in the field of a plant for treating incoherent plastics, such as, for example, a plant for dehumidifying and/or drying and/or crystallizing and/or conveying in a vacuum and/or under pressure plastics. This treatment plant can be intended, in particular, for supplying a user machine, such as, for example, a machine for processing and transforming plastics, in particular an extruder that supplies extruded plastics to an injection moulding and/or blow moulding and/or compression moulding apparatus.

In the plastics processing industry, using a flow of a process gas is known that comes into direct contact with the plastics, for example to dehumidify, dry, crystalize, convey, etc.

It is also known, for example in a dehumidification plant, for the plastics processed in the surrounding environment to release various contaminating substances, following heating by the process gas. These substances may include, for example, volatile organic compounds (known below for the sake of brevity as VOC) and/or volatile organic solvents (known below for the sake of brevity as VOS), including different chemical compounds formed by molecules provided with different functional groups, having different physical and chemical behaviours, in general characterized by a certain volatility.

These contaminating substances, which increasingly frequently derive from recycled polymers, have been given the acronym N.I.A.S. (Non-Intentionally Added Substances) by the international scientific community.

To give a purely illustrative example, in the field of food packaging with PET granule, N.I.A.S. come from the process of recycling material (rPET). Examples of VOC are benzene, toluene, and limonene. Examples of VOS are aldehydes, ketones, esters, alcohols, and nitro compounds.

VOC/VOS emissions are becoming critical for the plastics moulding industry, in particular because of the use of increasingly high percentages of recycled material in addition to virgin material.

This is particularly felt in the sector of food packaging, where it is possible that the VOC/VOS come into contact with the packaged product. Examples of food packaging are preforms for bottles to contain liquids and the multilayer films for packaging foods. It is thus necessary to keep under control and regulate the percentage of VOC/VOS present in the packages.

Various separating devices (purification, condensation, absorption, etc) are currently known that are usable to retain the aforementioned substances. Nevertheless, various aspects of the prior art are improvable.

Firstly, it is desirable to determine the state of the separator directly in line in the system that processes the material.

It is further desirable to monitor the state of the separator, in particular the actual degree of saturation and/or absorption and/or condensation thereof, so as to provide a predictive analysis in view of future maintenance or replacement.

Another current limit is the ability to distinguish the VOC/VOS. In this regard, it is known to perform analyses by gas chromatography to identify the nature and quantity of VOC/VOS, for example benzene. However, this requires analysis laboratory instruments that are difficult to use in line in the process, significantly complex operating methodologies and criteria and long response times (in the order of hours or days) that are hardly reactive for continuous productive processes, in addition to highly qualified staff or staff to be trained professionally.

SUMMARY OF THE INVENTION

One object of the invention is to remedy one or more of the aforesaid limits and drawbacks of the prior art.

One object is to determine and monitor the status of a separator in real time during the process that uses the separator.

One object is to provide an analysis method and/or apparatus of a separator used for treating a process gas that flows in a closed circuit in the context of a plant to process incoherent plastics.

One advantage is enabling the effective degree of efficiency of a separator to be detected in real time, in particular the state of saturation of an absorption filtering medium.

One advantage is to provide an analysis method and/or apparatus that is suitable for detecting the condition of a separator such as, in particular, a filtering medium for gas or a condensation dehumidifier.

One advantage is permitting effective and reliable monitoring in real time of the degree of efficiency of absorption and/or clogging of an absorption filter, in particular an active carbon filter.

One advantage is to permit monitoring in real time of the operating status of a condensation dehumidifier of a process gas.

One advantage is to analyze and monitor in real time the degree of saturation and/or current efficiency and/or the deterioration over time of a separator that separates humidity and/or polluting substances contained in a process gas.

One advantage is to perform a real-time analysis of the degree of efficiency of an absorption filter, for example a filter of the molecular sieve type, in relation to at least one chemical compound or group of chemical compounds, in particular compounds of acetaldehyde and/or methane and/or total organic carbon and/or limonene.

One advantage is to make possible in real time effective monitoring of the operating status of a dehumidification device, a dehumidification device, in particular of the absorption type, for example molecular sieve filtration devices, arranged downstream of a filtration device and/or of a condensation device, in particular monitoring suitable for checking clogging of the dehumidification device due to contaminating substances present in the process gas and not completely retained by the filtering and/or by the condensation device.

One advantage is to devise an analysis method and/or apparatus that is suitable for detecting the condition and/or the status and/or the quality of the plastics during the processing process thereof (dehumidification and/or drying and/or crystallization and/or vacuum and/or pressure conveying, etc).

Such objects and advantages and still others are achieved by a method and/or an apparatus according to one or more of the claims set out below.

In one embodiment, an apparatus for analyzing an absorption filtering medium, in particular configured for separating volatile organic substances in a process gas of a dehumidification plant for dehumidifying polymer granules, includes a generator (for example a fan) of a flow of gas through the filtering medium, an analysis instrument that determines the concentration of total organic carbon in the gas, a device for measuring the concentrations of the total organic carbon in the flow of gas upstream and downstream of the filtering medium, a device for determining an operating condition (for example the saturation status and/or absorbent capacity and/or the deterioration over time) of the filtering medium on the basis of a comparison of the aforesaid measured concentrations.

BRIEF DESCRIPTION OF THE DRAWINGS

The invention can be better understood and implemented with reference to the attached drawings that illustrate embodiments thereof by way of non-limiting example, in which:

FIGS. 3, 4 and 5 show three examples of results of monitoring the condition of the filtration device performed in the plant of FIG. 2 by analysing the concentrations of total organic carbon;

FIG. 10 is a table showing by way of example the data of some measurements taken in a treatment plant for treating incoherent plastics, in particular in the dehumidification plant of FIG. 8;

DETAILED DESCRIPTION

Figure 1:
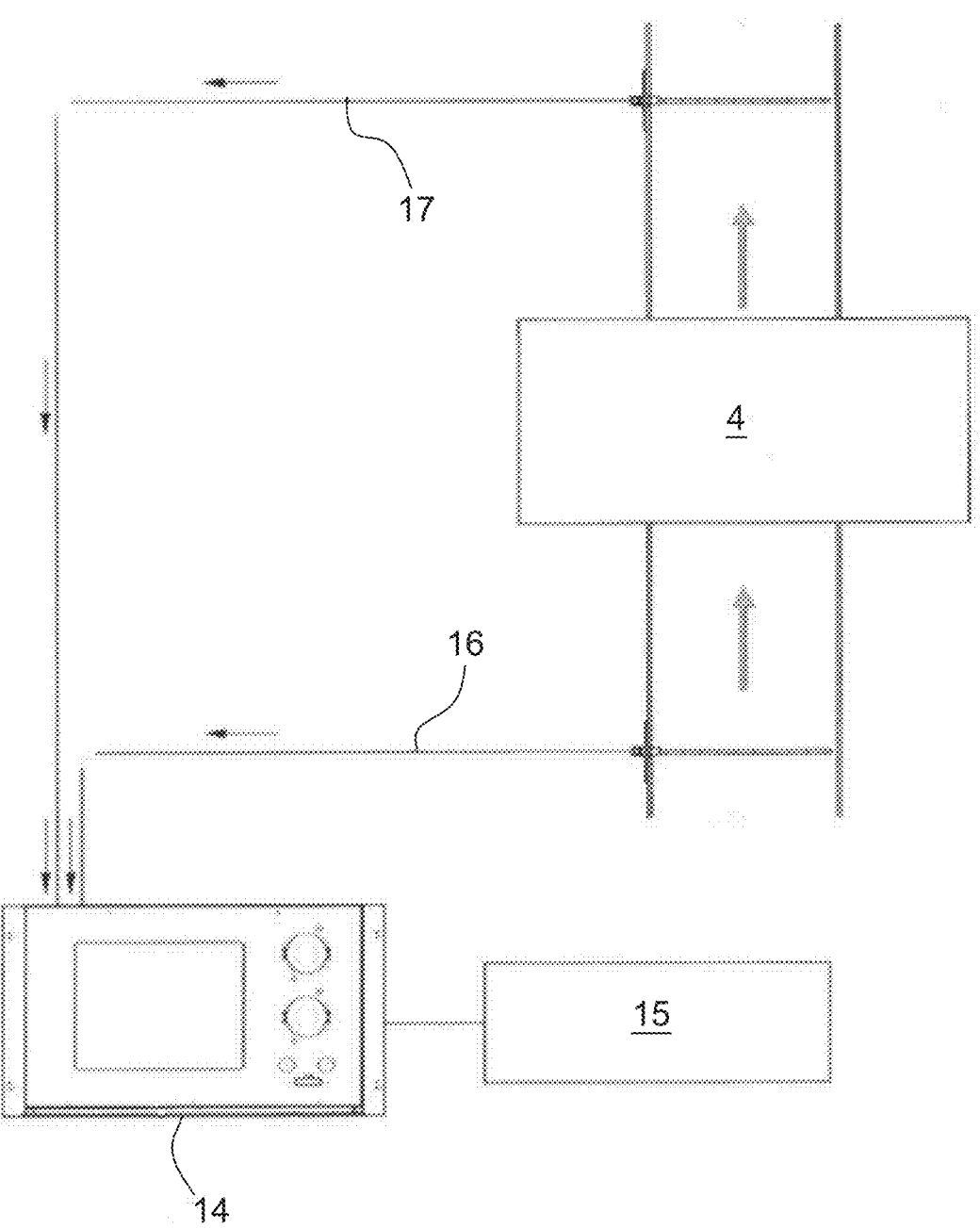
FIG. 1 shows, schematically, a first embodiment of an analysis apparatus in accordance with the present invention.
Figure 2:
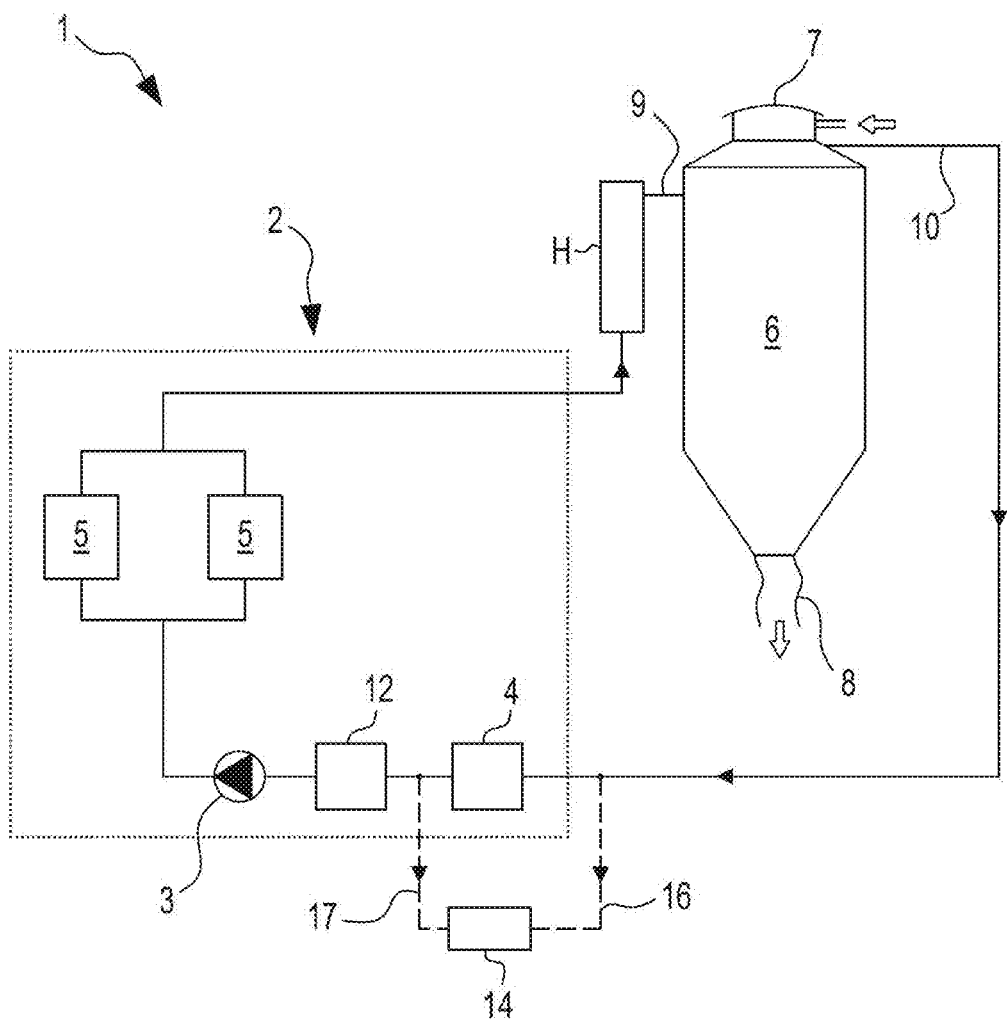
FIG. 2 shows a first embodiment of a dehumidification plant that includes the analysis apparatus of FIG. 1.

With reference to the aforesaid figures, identical elements of different embodiments have been indicated by the same numbering for the sake of simplicity and clarity.

Overall with 1, a material dehumidification plant has been indicated for dehumidifying incoherent plastics. The material dehumidification plant 1 may include, in particular, a gas dehumidification apparatus 2 configured to dehumidify a process gas (air). The gas dehumidification apparatus 2 may include, in particular, at least one flow generator 3 configured to generate a flow of the process gas. The flow generator 3 may include, for example, at least one fan.

The gas dehumidification apparatus 2 may include, in particular, at least one filtration device 4 to filter the process gas. The filtration device 4 may be, in particular, of the absorption type, for example of the active carbon type. The filtration device 4 may be configured, in particular, for retaining contaminating substances, for example N.I.A.S., in particular VOC and/or VOS.

The gas dehumidification apparatus 2 may include, in particular, a dehumidification device 5 including at least one dehumidification unit. The dehumidification device 5 may include, as in the specific embodiments, at least two dehumidification units placed parallel and controlled to alternate process steps and regeneration steps in a reciprocally coordinated manner. The dehumidification device 5 may, as in this specific case, be of the molecular sieve type. In particular, each of the two dehumidification units includes at least one molecular sieve. Each dehumidification unit may include a molecular sieve tower.

The material dehumidification plant 1 may include, in particular, at least one container 6 (hopper) in which the incoherent material is dehumidified. The container 6 includes at least one inlet 7 for the incoherent material and at least one outlet 8 for the incoherent material. The container 6 includes at least one inlet 9 of the process gas that comes into contact with the incoherent material and at least one outlet 10 for the process gas. The material dehumidification plant 1 may include, in particular, at least one supplying system 11 to supply the incoherent material to the inlet 7 of the container 6.

The gas dehumidification apparatus 2 may be configured, in particular, to dehumidify a process gas (for example air) and to supply the dehumidified process gas to the inlet 9 of the container 6. The gas dehumidification apparatus 2 may be configured, in particular, to receive and dehumidify the used process gas corning from the outlet 10 of the container 6. The gas dehumidification apparatus 2 may be configured, as in these embodiments, to operate in a closed circuit. It is nevertheless possible, in other embodiments that are not shown, to use a dehumidification apparatus operating in an open circuit.

The filtration device 4 may include, in particular, at least one filtering medium to purify the process gas of suspended solid particles and of N.I.A.S. and/or TOC and/or VOC and/or VOS. The filtering medium may include, in particular, at least one (contaminated) inlet side and at least one (purified) outlet side. The filtering medium may include, in particular, at least one filter of the active carbon type with flat, or tapered or to another type of geometry.

The flow generator 3 is configured to generate a flow of gas through the filtering medium from the (contaminated) inlet side to the (purified) outlet side. The flow generator 3 may be arranged, in particular, downstream of the filtering medium ("downstream" in relation to the direction of the gas flow during filtration from the contaminated side to the purified side). The flow generator 3 may be arranged, in particular, between the filtration device 4 and the dehumidification device 5.

The gas dehumidification apparatus 2 may include, in particular, a sensor device configured to detect the pressure of the process gas at an outlet of the filtration device 4 and/or to detect the pressure drop of the process gas between the inlet and outlet of the filtration device 4.

The gas dehumidification apparatus 2 may include, in particular, at least one heat exchanger 12 arranged along the flow of process gas, in particular between the filtration device 4 and the dehumidification device 5. The heat exchanger 12 may be used to condition the process gas, in particular to adjust the temperature of the process gas upstream of the dehumidification device 5.

Figure 7:
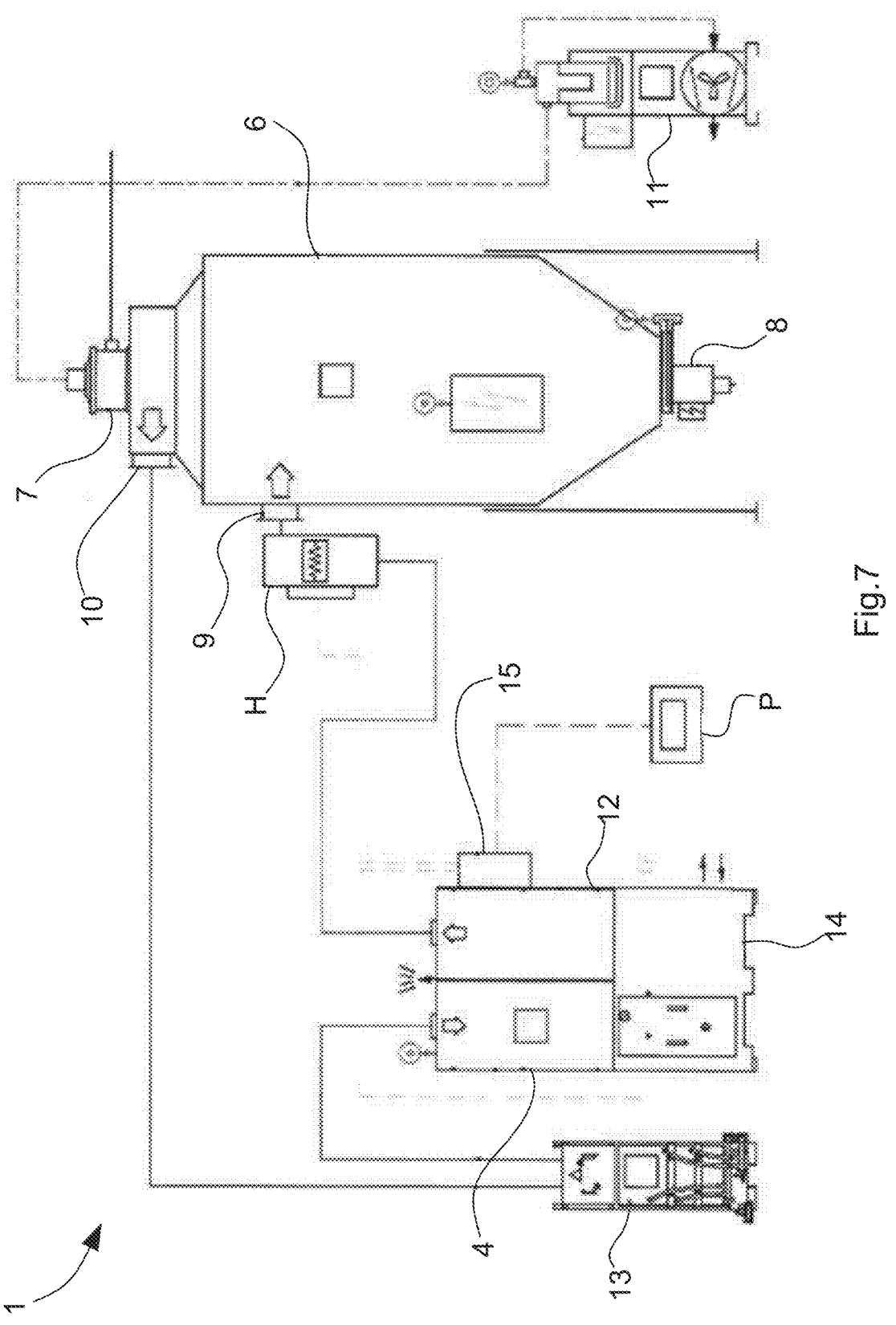
FIG. 7 shows a second embodiment of a dehumidification plant that includes an analysis apparatus according to the present invention, for example as in FIG. 1 or as in FIG. 6.
Figure 8:
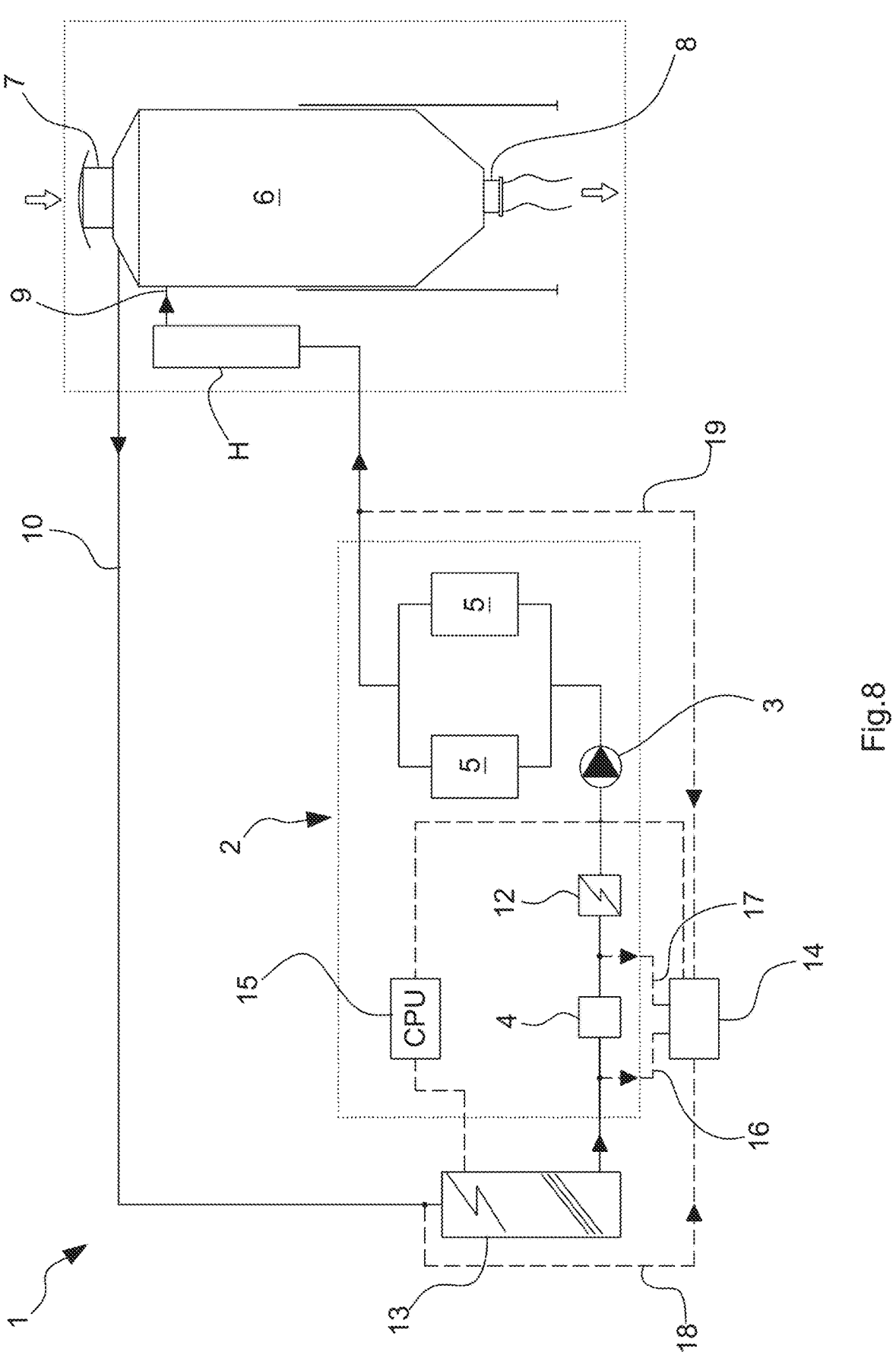
FIG. 8 shows a third embodiment of a dehumidification plant that includes an analysis apparatus according to the present invention, for example as in FIG. 1 or as in FIG. 6.

The material dehumidification plant 1 may include, as in the embodiments of FIGS. 7 and 8, at least one condensing unit 13 configured to dehumidify by condensing the process gas, in particular the gas coming from the outlet 8 of the container 6. The condensing unit 13 may include, in particular, at least one filter for retaining powder material suspended in the process gas and at least one condenser for separating the humidity from the process gas. The condensing unit 13 is arranged to deliver the (at least partially purified and/or dehumidified) process gas to the filtration device 4.

The material dehumidification plant 1 may include, in particular, at least one analysis apparatus for monitoring the operating status of one or more of the various separators used in the plant to treat (filter, purify, condense, etc) the process gas. These separators may include, as in these embodiments, the filtration device 4, the dehumidification device 5 and the gas condensing unit 13. The analysis apparatus may include, in particular, at least one analysis instrument 14 configured to perform the analysis in question.

The material dehumidification plant 1 may include, in particular, at least one control unit 15, or central processing unit to control the plant, for example a programmable electronic unit (in particular with PLC and/or PC and/or microprocessor, etc), connected to to the analysis instrument 14.

The material dehumidification plant 1 may include, in particular, at least one heater H arranged to heat the process gas before entering the container 6 through the inlet 9 for the gas. The material dehumidification plant 1 may include, in particular, at least one user interface P for the interaction of a user with the control unit 15.

The analysis apparatus may include, in particular, at least one filter inlet 16 sampling line arranged to take at least one sample of the process gas before the filtration device 4 (in particular after the gas condensing unit 13 if present and/or at or near an inlet of the filtration device 4) and deliver this gas sample to the analysis instrument 14. The filter inlet 16 sampling line may be, in particular, provided with a heating arrangement (hot line) to prevent condensation phenomena.

The analysis instrument 14 may be used, in particular, also as a single analysis instrument configured so as to control two or more dehumidification plants simultaneously.

The analysis apparatus may include, in particular, at least one filter outlet 17 sampling line arranged to take at least one sample of the process gas after the filtration device 4 (in particular before the heat exchanger 12 if present and/or before the dehumidification device 5 and/or at or near an outlet of the filtration device 4) and deliver this gas sample to the analysis instrument 14. The filter outlet 17 sampling line may be, in particular, devoid of a heating arrangement (cold line).

The analysis apparatus may include, in particular, at least one condenser 18 sampling line arranged to take at least one sample of the process gas before the gas condensing unit 13 (at or near an inlet of the gas condensing unit 13) and deliver this gas sample to the analysis instrument 14. The condenser 18 sampling line may be, in particular, provided with a heating arrangement (hot line) to prevent condensation phenomena.

The analysis apparatus may include, in particular, at least one dehumidifier 19 sampling line arranged to take at least one sample of the process gas after the dehumidification device 5 (at or near an outlet of the dehumidification device 5) and deliver the sample to the analysis instrument 14. The dehumidifier 19 sampling line may be, in particular, provided with a heating arrangement (hot line) to prevent condensation phenomena.

Each of the sampling lines 16, 17, 18 and 19 may be provided with a heating arrangement to prevent condensation phenomena, in particular in the presence of high concentrations of contaminants. In particular, it has been established that, for each sampling line 16, 17, 18 and 19, with temperature values above 400° C. there are no condensation phenomena.

Each of the sampling lines 16, 17, 18 and 19 may include at least one sampling end arranged so as to remove at least one gas sample to be analyzed (sampling point). In particular, the sampling line 18 (if present) may be positioned with the sampling point at the inlet or near the inlet of the condenser, in particular as a single heated line, usable in particular to perform a quality control check of the product being processed. In particular, the sampling lines 16 and 17 are positioned with the sampling points, respectively, at the inlet and at the outlet (or near the inlet and the outlet) of the active carbon filtering system, as two cold, or non-heated, lines, that are usable, in particular, to perform a check of the status of the active carbon filtering medium. The sampling line 19 may be positioned with the sampling point at the outlet, or near the outlet, or after the absorbing system (for example of the molecular sieve type), as a cold, or not heated, line, which is usable, in particular, to perform a check of the status of the absorbing system.

The analysis instrument 14 may include, in particular, a gas chromatographic analysis instrument (in particular a multi-line process gas chromatographic analyzer). The analysis instrument 14 may include, by way of an example that must be taken to be purely illustrative and non-limiting, a flame ionization detector (FID).

The analysis instrument 14 may include, according to other embodiments, an analysis instrument of another type such as for example a thermal conductivity detector (TCD), or an optical (for example infrared) gas detector, or a catalytic gas sensor or semiconductor gas sensor or sensor of yet another type.

Figure 6:
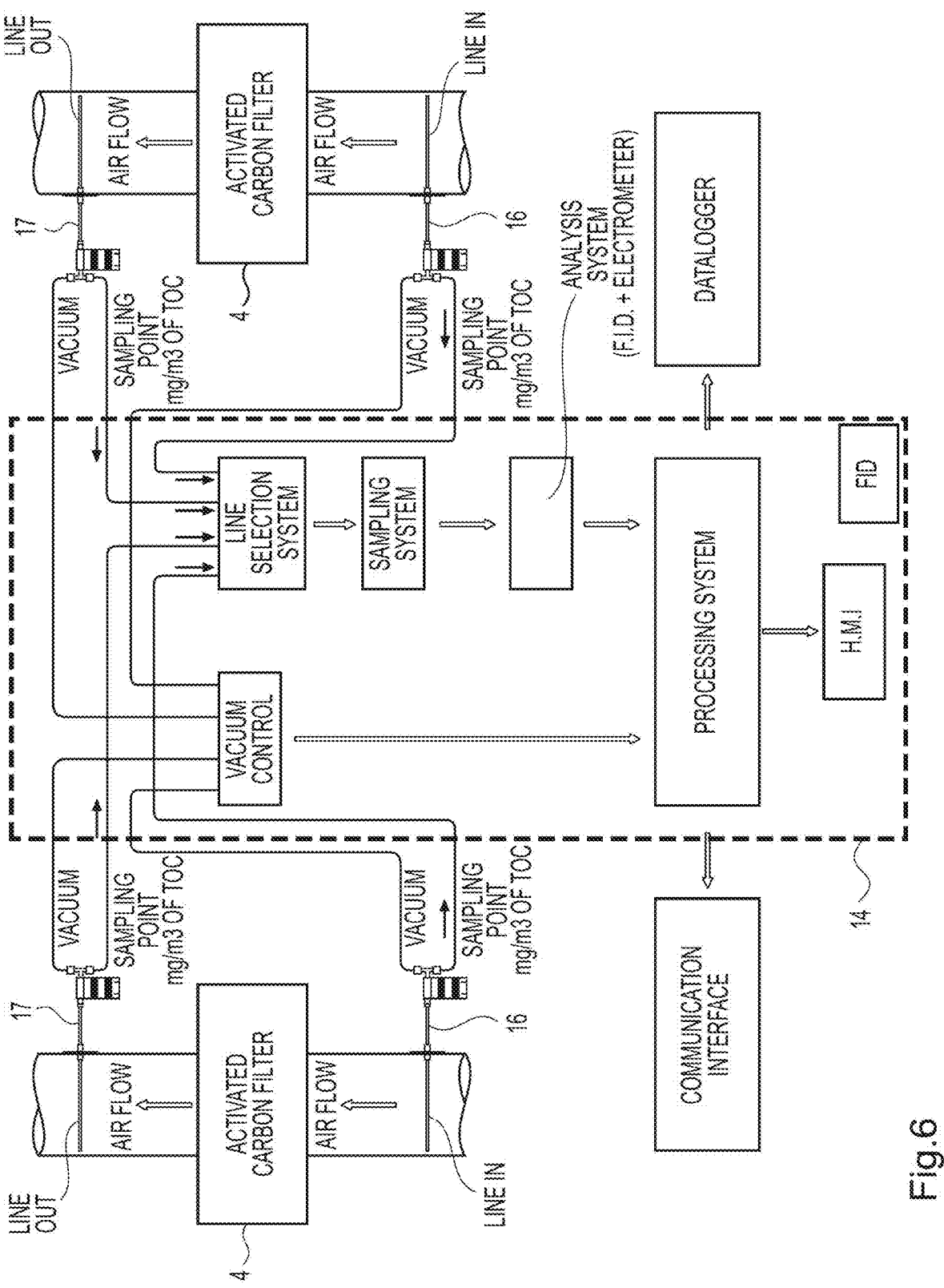
FIG. 6 shows, schematically, a second embodiment of an analysis apparatus according to the present invention.

FIG. 6 shows a diagram of an embodiment provided merely by non-limiting example of an analysis instrument 14 (flame ionization detector, or FID) that is usable in accordance with the invention. The analysis instrument 14 (in FIG. 6 it is the part contained in the dotted line) is configured, in particular, to analyze the total organic carbon (TOC). The analysis instrument 14 may be configured, as in the embodiment in FIG. 6, to monitor two distinct separators. The analysis instrument 14 includes in this case two reading channels, each of which includes a tube configured to convey the sample of process gas to be analyzed taken before and after the respective separator.

The analysis instrument 14 (for example, as said, of the type used to analyze fumes) is provided with a washing arrangement (in particular of known type) to wash the to reading channel at the end of each sampling session. The analysis instrument 14 may be configured, in particular, to perform readings with periodic sampling, for example at a set and programmable rate (for example at a rate of the order of a few dozen seconds).

The analysis instrument 14 may be connected, in particular, to at least two sampling and analysis lines of the separator, i.e. a sampling line for analyzing the process gas entering the separator to be monitored and the other sampling line for analyzing the process gas exiting the separator.

The analysis instrument 14 (by gas chromatography) may be configured, in particular, to distinguish the presence of acetaldehyde and/or of methane and/or of limonene from the possible presence of other contaminating hydrocarbons.

It has been shown experimentally that a used separator, in particular an absorption filtering medium, for example including active carbons, can contain not insignificant quantities of acetaldehyde. This entails the risk that in the analysis of the results of a gas chromatographic analysis of the filtered gas exiting the separator, the acetaldehyde may cover the other hydrocarbons present in the same analysis peak, greatly limiting the efficacy and reliability of the analysis of the current efficiency of the separator. The present invention enables this drawback to be overcome.

The method of analysis may include, in particular, the step of taking at least one sample of process gas from a sampling point situated at or near an inlet of a separator (filtration device 4, dehumidification device 5, gas condensing unit 13) and of conveying the gas sample to the analysis instrument 14 for analyzing the concentration of total organic carbon.

The method of analysis may include, in particular, the step of taking at least one sample of process gas from a sampling point situated at or near an outlet of the aforesaid separator (filtration device 4, dehumidification device 5, gas condensing unit 13) and of conveying the gas sample to the analysis apparatus 14 of the concentration of total organic carbon.

The method of analysis may include, in particular, the step of determining the concentrations of methane, both in the entering gas sample and in the exiting gas sample. The method of analysis may include, in particular, the step of determining the concentrations of acetaldehyde, both in the entering gas sample and in the exiting gas sample. The method of analysis may include, in particular, the step of determining the concentrations of total organic carbon (TOC), both in the entering gas sample and in the exiting gas sample. The method of analysis may include, in particular, the step of determining the concentrations of total organic carbon less the concentrations of acetaldehyde and/or less the concentrations of methane and/or less the concentrations of limonene, both in the entering gas sample and in the exiting gas sample.

The method of analysis may include, in particular, the step of comparing at least one concentration measured in the sample of entering gas with at least one concentration measured in the sample of exiting gas. In this comparison step, it is possible to compare two concentrations of entering and exiting methane, i.e. a concentration of the gas sample before the separator and a concentration of the gas sample after the separator. In this comparison step, it is possible to compare together two concentrations of entering and exiting acetaldehyde. In this comparison step, it is possible to compare together two concentrations of the total entering and exiting organic carbon. In this comparison step, it is possible to compare together two entering and exiting concentrations of the total organic carbon without methane and/or without acetaldehyde and/or without limonene.

The separator, to which the aforesaid steps of the method of analysis are applied, may include, in particular, the filtration device 4. In other embodiments, the separator, to which the aforesaid steps of the method of analysis are applied, may include the dehumidification device 5. In other embodiments, the separator, to which the aforesaid steps of the method of analysis are applied, may include the gas condensing unit 13.

The method of analysis may include, in particular, the step of taking at least one sample of process gas to be condensed from a sampling point situated at or near an inlet of the gas condensing unit 13 and of conveying the sample of the gas to be condensed to the analysis instrument 14.

The method of analysis may include, in particular, the step of taking at least one sample of dehumidified process gas from a sampling point situated at or near an outlet of the dehumidification device 5 and of conveying the dehumidified gas sample to the analysis instrument 14.

The method of analysis may include, in particular, the step of comparing at least one concentration measured in the gas sample to be condensed (i.e. taken before the gas condensing unit 13) with at least one concentration measured in the dehumidified gas sample (i.e. taken after the dehumidification device 5). In this step, it is possible to compare together two measured concentrations of entering and exiting methane, i.e., respectively, one a concentration of the gas sample to be condensed and the other a concentration of the dehumidified gas sample. In this step, it is possible to compare together two measured concentrations of entering and exiting acetaldehyde (respectively, gas to be condensed and dehumidified gas). In this comparison step, it is possible to compare together two measured concentrations of the total entering and exiting organic carbon (respectively, gas to be condensed and dehumidified gas). In this comparison step, it is possible to compare together two calculated entering and exiting concentrations (respectively, gas to be condensed and dehumidified gas) of the total organic carbon without methane and/or without acetaldehyde and/or without limonene.

The method of analysis may include, in particular, the step of taking at least one sample of wet process gas from a sampling point situated at or near the outlet 10 of the container 6 and of conveying the sample of the wet process gas to the analysis instrument 14.

The method of analysis may include, in particular, the step of taking at least one dehumidified gas sample from a sampling point situated at or near the inlet 9 of the container 6 and of conveying the dehumidified gas sample to the analysis instrument 14.

The method of analysis may include, in particular, the step of comparing at least one concentration measured in the wet gas sample (i.e. taken after the outlet 10) with at least one concentration measured in the dehumidified gas sample (i.e. taken before the inlet 9). In this comparison step, it is possible to compare together two measured concentrations of methane exiting or entering the container 6, i.e. a concentration of the exiting wet gas sample and another concentration of the entering dehumidified gas sample. In this step, it is possible to compare together two measured concentrations of acetaldehyde exiting and entering the container 6 (exiting wet gas and entering dehumidified gas). In this comparison step it is possible to compare together two measured concentrations of the total organic carbon exiting and entering the container 6 (exiting wet gas and entering dehumidified gas). In this comparison step it is possible to compare together two calculated concentrations, exiting and entering the container 6 (exiting wet gas and entering dehumidified gas), of the total organic carbon without methane and/or without acetaldehyde and/or without limonene.

During normal operation of the material dehumidification plant 1, the filtration device 4 (for example an absorption filtration device) retains the contaminants, so that the measured or calculated concentration (for example the concentration of TOC) entering the filtration device 4 has a higher value than the exiting concentration (for example of TOC). The concentration may be, for example, expressed in mg/m³ and/or in parts per million (ppm) and/or in parts per billion (ppb).

When the filtration device 4 reaches saturation, it is no longer capable of retaining the contaminants and thus the concentration (for example of TOC) exiting the filtration device 4 increases until it reaches a level the same as or similar to the level of the entering concentration.

For example, if the analysis instrument 14 reveals a concentration of TOC entering the filtering medium of about 100 ppm and a concentration of TOC exiting the filtering medium at a value equal to about 100 ppm, it is deduced that the filtering medium is saturated (in particular is no longer absorbing).

FIGS. 3, 4 and 5 show three embodiments, which must be deemed to be illustrative and non-limiting, of the values measured over time of the concentrations of TOC entering and exiting the filtration device 4.

In FIG. 3, the comparison can be observed between the inlet and outlet of an absorption filtering medium with high absorption capacity, in which the value of the entering concentration of TOC is relatively low, which may occur, for example, in the production of preforms where the percentage of recycled plastics granules (r-PET) is very low with respect to the virgin material (for example lower than 10%). In this embodiment, the filtering medium must be deemed to be efficient, without the need for maintenance.

In FIG. 4, the value of the entering concentration of TOC is relatively high and it can be observed from the comparison that the filtering medium has great absorption capacity. The embodiment of FIG. 4 represents the case of production of preforms where the percentage of recycled plastics granule (r-PET) compared with virgin material is relatively high (for example between 40% and 70%). Also in this embodiment, the filter must be deemed to be efficient, without any need for maintenance.

In FIG. 5 it is observed that, the value of the concentration of entering TOC is relatively high and that, from a certain moment onwards, also the value of the concentration of exiting TOC is relatively high. This means that the filtering medium must be deemed to be saturated and has to be replaced or subjected to maintenance.

The comparison of entering and exiting concentrations (for example of TOC) thus provides information on the operating status of the filtering medium and indicates whether the filtering medium is to be subjected to maintenance or replaced.

Figure 9:
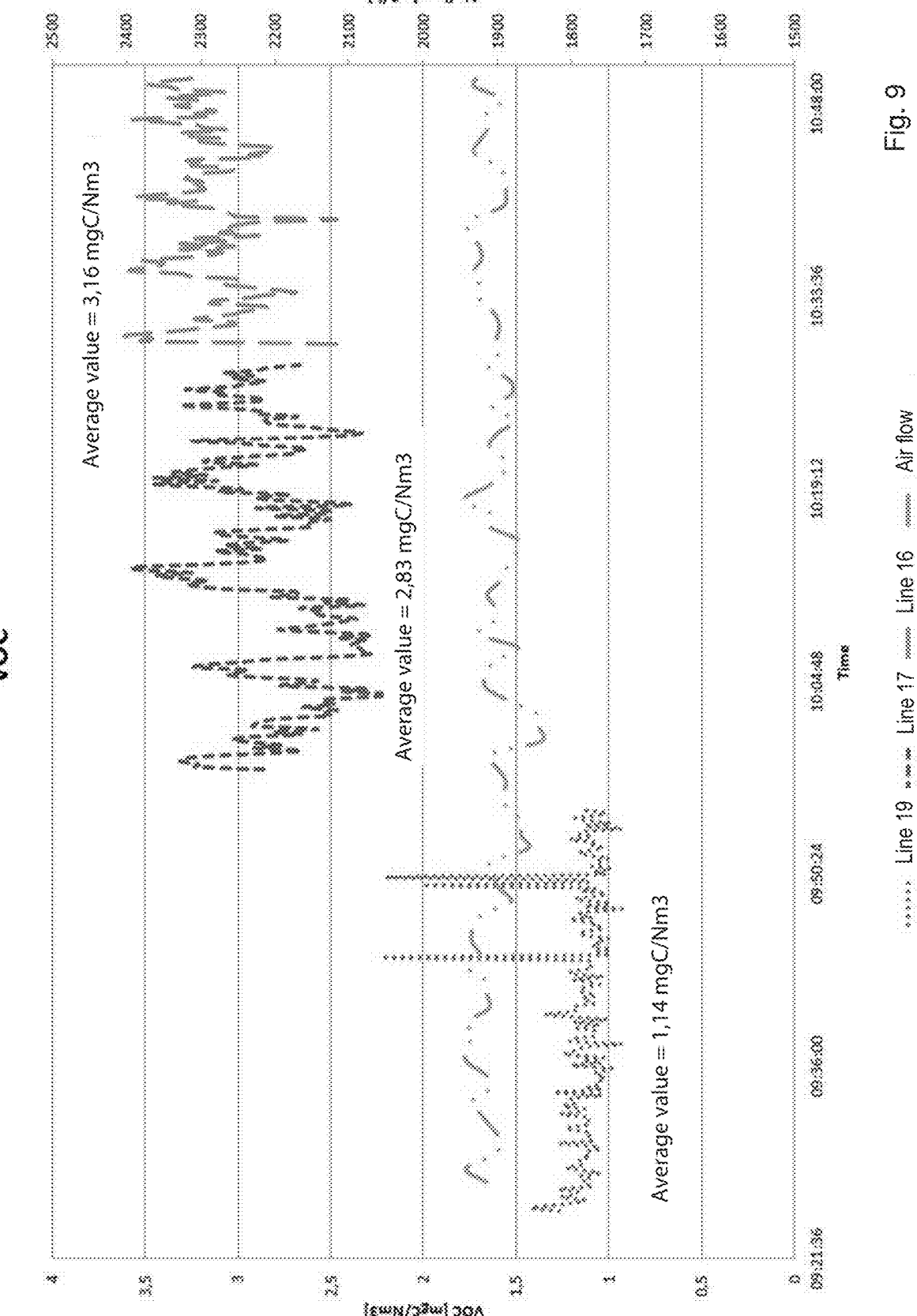
FIG. 9 is an exemplifying graph of VOC values measured in three different sampling zones of a treatment plant for treating incoherent plastics, in particular of the dehumidification plant of FIG. 8.

FIG. 9 shows by way of example the values of the concentrations of VOC to measured over time in samples taken from three different sampling points of the plant of FIG. 8, i.e. taken from lines 16, 17 and 19. The graph of FIG. 9 also shows the values of the flow of air processed by the dehumidification plant.

FIG. 9 further shows the average value of the values of the concentrations of VOC read by the line 16, placed at the inlet of the absorbing medium, and the average value of the values of the concentrations of VOC read by the line 17, placed at the outlet of the absorbing medium. The difference between the average value of the concentrations of VOC of the line 16 and the average value of the concentrations of VOC of the line 17 may be used as an indication of the absorption capacity of the absorbing medium.

FIG. 9 further shows the average value of the values of the concentrations of VOC read by the line 19 placed at the outlet of the dehumidification device. The difference between the average value of the concentrations of VOC of the line 17 and the average value of the concentrations of VOC of the line 19 may be used as an indication of the quantity and/or of the concentration of acetaldehyde contained in the process gas.

It is also possible to determine (in particular with reference to FIG. 9) the difference between the average value of the concentrations of VOC of the line 16 (absorbing medium inlet) and the average value of the concentrations of VOC of the line 19 (dehumidification device outlet), in which this difference may be used as an indication of the quantity or concentration of the residue of contaminants. In the specific embodiment shown in FIG. 9, purely indicatively, it is possible to obtain the following information:

quantity of retained contaminants=2.02 $mgC/Nm^3$;
quantity of contaminants not retained but left in circulation=1.14 $mgC/Nm^3$.

The table of FIG. 10 shows, by way of example, the data detected by tests conducted in a dehumidification plant of rPET, with a clear presence of acetaldehyde. The quantity of certain single substances can be determined by differences in the values shown in FIG. 10. For each measured concentration value, the absolute values are shown and the relative values associated with the actual flowrate of the process gas (determined by the dehumidification plant and expressed in $m^3/kg$).

In FIG. 10, for the methane base, we can consider the value of the concentration exiting the dehumidification device of the plant, which amounts to 0.91 $mgC/Nm^3$, corresponding to 1.7 ppm of methane (value very near the typical environmental average). In the case under examination, the filtering medium is made of active carbon, so that it can be considered, in particular, that the retained compounds consist substantially of benzene. The rest of the compounds, which is not retained, can be considered, in particular, to consist substantially of acetaldehyde.

In one embodiment, it is possible to perform a quality check of the rPET, by determining the concentrations of limonene, in particular by a gas chromatographic analyzer.

In this embodiment, it is possible to aspirate a gas sample, for example by an aspiration system (pump or Venturi), from the sampling point (for example from the container or hopper). The gas sample may be conveyed to a gas chromatographic analyzer. The sampling line may be, in particular, thermoregulated (for example at a temperature of about 100° C., or included between 80° C. and 120° C.), to prevent the condensation of the heavier hydrocarbons. When the gas sample enters the analyzer, a known quantity of the gas sample is pushed through a gas chromatographic column, in which the limonene is separated from the other hydrocarbons found in the gas. Then a detector, in particular a flame ionization detector (FID), determines the concentration of the limonene.

If the recycled rPET granulate being processed is of good quality, the analyzer will determine relatively low concentrations of limonene, whereas on the other hand, if the recycled rPET granulate being processed is of poor quality, the analyzer will determine high concentrations of limonene.

In general, the in-line quality check, in order to detect the quality of the product being processed, enables an operator to intervene preventively on the processing process. This preventive intervention may be performed manually by an operator, or may be performed automatically by transfer of the data acquired by the detector to an electronic control system (a PLC, or a PC connected to a company network, etc) configured to store and manage the data. The electronic control system may be configured, in particular, to arrest the productive process of the plastics treatment plant and/or to increase the flow and/or the temperature of the process fluid (drying air), etc.

The response time of a gas chromatographic system to determine the concentration of a single hydrocarbon or group of hydrocarbons, by separating the hydrocarbon or the group of hydrocarbons from the other contaminating hydrocarbons (TOC) present in the gas sample, may be, in particular, about 10 minutes for limonene, about 3 minutes for the acetaldehyde and methanol group. The same system of analysis could determine the total concentration of acetaldehyde and methanol (grouped in a single peak), determine the concentration of the limonene and determine the total concentration of all the other (contaminating) hydrocarbons that exit between the peak of the acetaldehyde and methanol group and the peak of the limonene. It is possible that the total sum of the hydrocarbons will not be reached because the analysis could stop at the peak of the limonene. In fact, it could be sufficient to stop once the peak of the limonene is reached (after about 10 minutes), also because the analysis of the total of the hydrocarbons could be very long about 30 minutes).

It is observed that it is not necessary to identify, in the gas samples taken, the concentrations of all the hydrocarbons absorbed by the filtering medium. It is nevertheless possible to determine, in the gas samples taken, the concentrations of acetaldehyde and/or of methane and/or of limonene. The analysis instrument 14 can perform a gas chromatographic analysis that is able to distinguish the methane and/or the acetaldehyde and/or the limonene from all the other TOC contaminants present in the process gas. It is thus possible to compare the concentrations of these other TOC contaminants entering and exiting the filtering medium. It is also possible to make a comparison between the concentrations of methane, the concentrations of acetaldehyde, the concentrations of limonene, and the total concentrations of TOC entering and exiting the filtering medium.

The method of analysis in question provides an almost immediate response, in real time, which enables the plant to be monitored and the operators to be informed about the actual degree of saturation of the separators and the current quality of the process gas who are assigned to routine and/or extraordinary maintenance of the plant. Experiments have established that the response times that are obtainable with the method of analysis in question are considerably reduced, for example to a few dozen seconds.

It is further possible to monitor the saturation status of the filtering medium by analyzing the concentration values (for example TOC concentration values) measured over time to determine in advance when there will be the next maintenance intervention, in particular on the basis of the greater or lesser variation of the concentration in the unit of time. If, for example, the variation of the concentrations of TOC measured downstream of the separator in a given period of time ΔT is high, the time envisaged for the maintenance intervention will be reduced whereas, vice versa, if the variation of the concentrations of TOC measured downstream of the separator in the period ΔT is reduced, the time envisaged for performing the maintenance intervention will be high. It is possible, in particular, to predict when the concentration downstream of the separator will reach a set value on the basis of the concentrations measured in the time downstream of the separator.

Detecting the concentrations of TOC (and/or of methane and/or of acetaldehyde and/or of limonene) at the outlet 8 of the container 6 (and/or entering the filtration device 4 and/or entering the gas condensing unit 13) enables the quality of the polymer to be determined whilst the polymer is processed, as, for example, a high concentration of TOC (and/or of methane and/or of acetaldehyde and/or of limonene) in the process gas will be indicative of a high concentration of contaminants and thus of poor quality of the processed polymer.

Owing to the invention, a user can intervene to modify one or more process parameters to adapt the material processing process on the basis of the results of the analysis of the process gas performed in real time. It is possible, for example, to arrest the productive process, or modify the percentage of recycled material (for example r-PET) with respect to the virgin material, or increase the flow of the process fluid, or raise the temperature of the dehumidification and/or drying gas, or reduce the hourly production of the processed material, etc.

Owing to the invention, it is possible to perform an in-line quality control check, in order to detect the quality of the material being processed, enabling preventive intervention on the processing process, to obtain a product of quality, making the processing process substantially automatic.

The method of analysis in question could be applied not only in a transforming plant that processes the plastics granule to obtain a finished product, but also in a plant for producing recycled plastics granule, in which the recycling process involves using a flow of air to heat and dry the recycled plastics before the plastics enter a device (extruder) that is suitable for transforming the recycled plastics into plastics granule.

Figure 11:
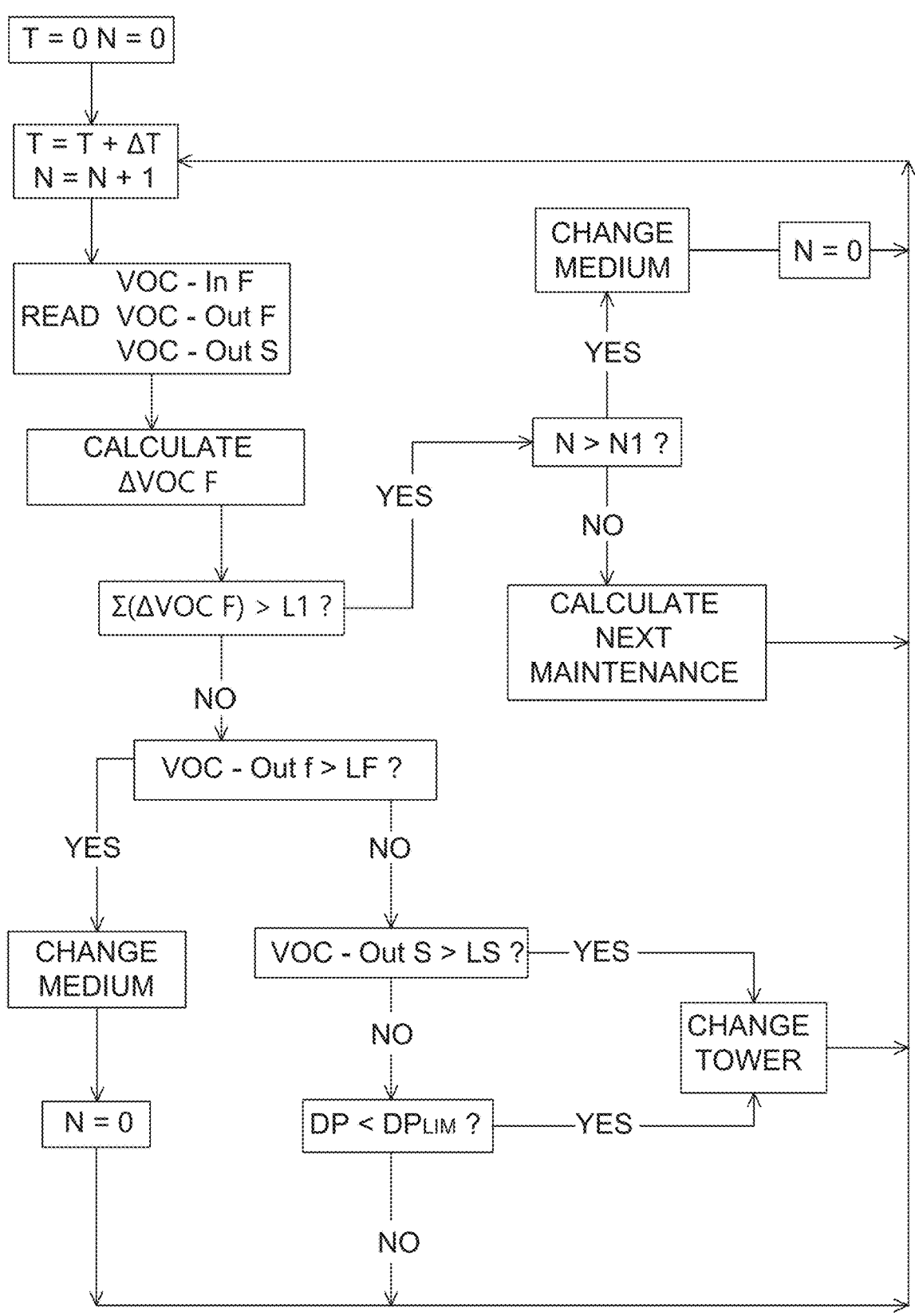
FIG. 11 is a flow chart showing an embodiment of an analysis method according to the present invention.

In FIG. 11, an embodiment is shown of an analysis and monitoring algorithm of the filtering medium. The meaning of the symbols in FIG. 11 is as follows:

T=time counter;

N=number of interactive algorithm cycles;

VOC-InF=VOC concentration measured in the line 16 (upstream of the absorbing medium);

VOC-OutF=VOC concentration measured in the line 17 (downstream of the absorbing medium);

VOC-OutS=VOC concentration measured in the line 19 (downstream of the dehumidification device);

ΔVOC F=difference between VOC-InF and VOC-OutF (VOC concentrations before and after the absorbing medium) for each cycle of the interactive algorithm;

L1=set limit value of accumulation of the absorbing medium;

LF=set limit value of absorption of the absorbing medium;

LS=set limit value of saturation of the dehumidification device;

N1=limit value of the maximum number of cycles for which it is possible to exceed L1;

DP=dew point value measured at the outlet of the dehumidification device;

$DP_{LIM}$=limit value of the dew point on the basis of which to activate the reversal of the process step and the regeneration step for the two dehumidification units (towers) of the dehumidification device arranged parallel.

At each cycle, the algorithm determines the concentrations of VOC in lines 16, 17 and 19, calculates the difference ΔVOC F (and possibly also the difference between VOC-OutF and VOC-OutS) and calculates the sum of the various differences ΔVOC F calculated in all the cycles from the start of the procedure. After this, it compares the set limit values and, on the basis of these comparisons, can proceed to the next cycle without intervening or reporting anything, or can issue an alarm to indicate the need to replace the absorbing medium, or can issue an indication relating to the time envisaged for the next maintenance of the absorbing medium, or can issue a signal to control the tower change, i.e. the reversal of the alternating process/regeneration for the two dehumidification units (towers) of the dehumidification device.

The algorithm enables it to be ascertained whether there is the need to regenerate a dehumidification unit on the basis of the measured level of concentration of contaminants absorbed by the medium (molecular sieve) of the dehumidification unit, in particular when the measured value VOC-OutS exceeds the limit value LS. Further, the algorithm enables it to be established whether there is a need for the regeneration of a dehumidification unit on the basis of the dehumidification condition of the medium (molecular sieve), in particular when the measured value DP exceeds the limit value $DP_{LIM}$.

Each of the limit values LF, LS, L1, N1, $DP_{LIM}$ can be set on the basis of need and can be resettable.

The invention claimed is:

1. A method of analysis including the steps of:

generating a flow of process gas through a separator from an inlet side to an outlet side of the separator;

detecting limonene concentrations in the process gas on the inlet side and/or on the outlet side;

introducing the process gas coming from the outlet side into a container of material to be processed;

detecting a limonene concentration in the gas in the container or in the gas coming from an outlet of the container;

determining at least one operating condition based on concentrations detected in the detecting steps.

2. The method according to claim 1, wherein the at least one operating condition includes an operating condition of the separator and/or an operating condition of the material.

3. The method according to claim 1, wherein the separator includes at least one filtration device with at least one absorption filter medium.

4. The method according to claim 3, wherein the at least one absorption filter medium is of the activated carbon type.

5. The method according to claim 1, wherein the separator is configured to filter one or more volatile organic compounds.

6. The method according to claim 5, wherein the one or more volatile organic compounds includes benzene and/or toluene and/or limonene.

7. The method according to claim 1, wherein the separator includes at least one gas condensing unit.

8. The method according to claim 1, wherein the separator includes a molecular sieve dehumidification device.

9. The method according to claim 1, wherein the separator is configured to filter one or more volatile organic solvents.

* * * * *